Jan. 25, 1927. 1,615,452
G. HEDÉN
BUOYING AND DRIVING MECHANISM FOR FLYING MACHINES
Filed Feb. 18, 1926
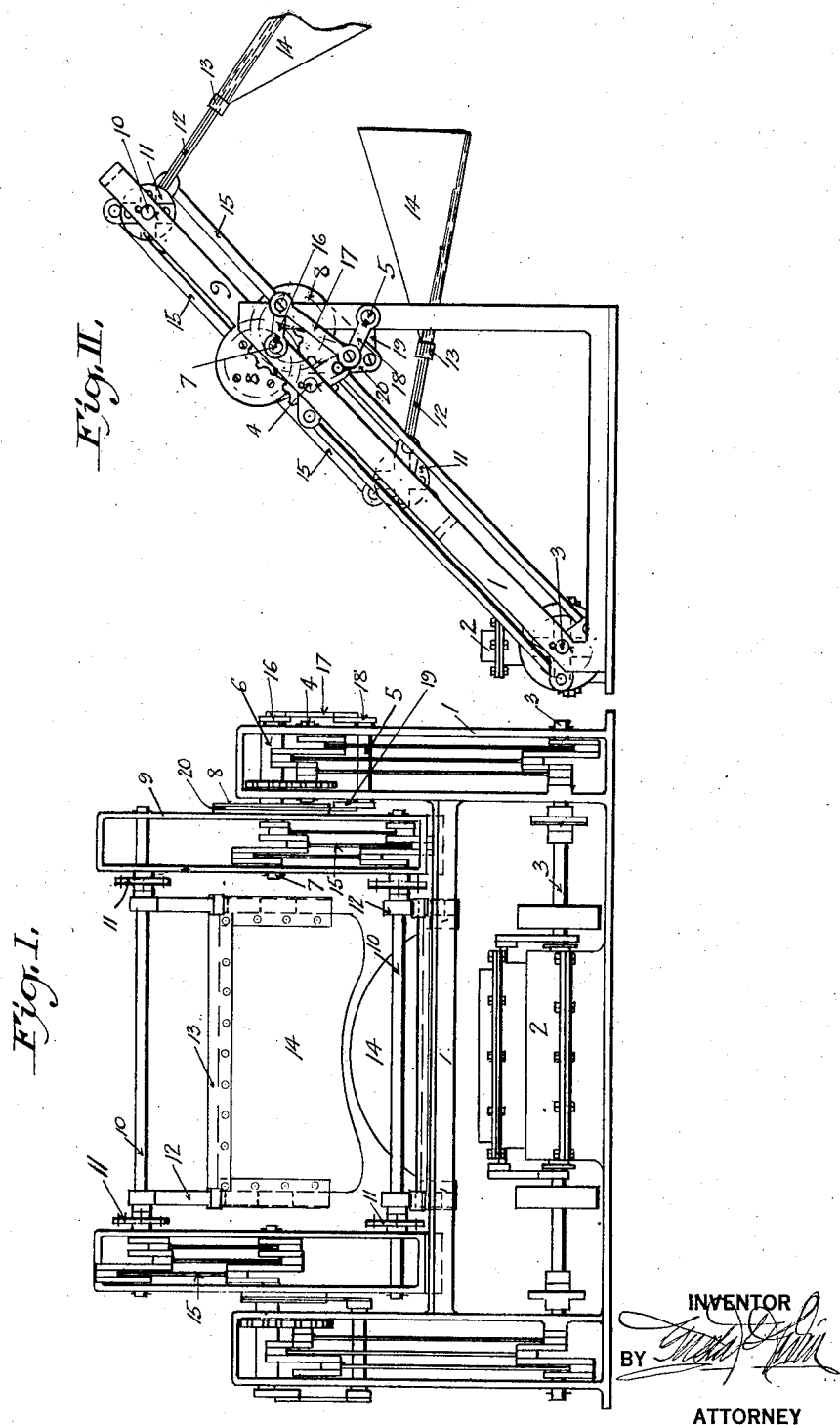

Patented Jan. 25, 1927.

1,615,452

UNITED STATES PATENT OFFICE.

GUSTAF HEDÉN, OF NEW YORK, N. Y.

BUOYING AND DRIVING MECHANISM FOR FLYING MACHINES.

Application filed February 18, 1926. Serial No. 89,217.

This invention relates to improvements in flying machines and has for its object to provide a buoying and driving mechanism having wings carried by rotatable and oscillatable frames fast on horizontal and parallel shafts, mounted in and between separate crank frames, rotated in unison by separate gear and crank connections to motors, said shafts being provided, besides, at one end by cranks which connect with those of outer central parallel crank shafts, operated by lower parallel crank arm shafts, oscillated by eccentrics, fast on said crank frames, and thus causing the wing frames to oscillate during their rotation.

Another object is to provide certain improvements in form, construction and arrangement of the several parts whereby the above and other objects may be effectively carried out.

A practical embodiment is represented in the accompanying drawings in which—

Fig. I represents in front elevation a portion of a flying machine which includes my improved construction.

Fig. II represents a side elevation of the same.

The body of the machine, denoted by 1, provides eight bearings at each side, namely two for each of motor crank shafts 3, gear and crank shafts 4, oscillating crank arm shaft 5, and one bearing for each of hollow gear shafts 6 and oscillating crank shaft 7.

The hollow gear shafts 6 are fast on eccentric discs 8 which are fast on outer sides of crank frames 9 and are placed at 90° angles to the latter, each of which provide two bearings for each of oscillating crank shafts 7, oscillating and rotating crank shafts 10, each of which carry two universal joints 11 and on which shafts are fast wing frames 12—13, composed of a rigid spacer 13, fast on two multiple spring arms 12 which have secured between them sheets of silk, canvas or other flexible material which forms the wings 14. Each of the wings 14 has one side fast on the spacer 13 and two of its sides secured to the spring arms 12 in such manner that the rear edge remains loose.

By this construction, the wing when in use, will have a tendency to form a scoop, and to evade the air by falling in its frame when it is moved upward, as shown in Figs. I and II.

By the construction of the elastic arms 12, which start in front with four spring bars cut off step-like and ending in one at the rear, the rear edge of the wing becomes practically non-existent, as in the bird wing, for the air may pass it without resistance.

Oscillating and rotating crank shafts 10, although each is journaled in the bearings of both crank frames 9, are provided with cranks at one end only and these connect by rods 15 to cranks of oscillating crank shafts 7, each of which is provided with one outside crank arm 16 which connects by rod 17 to crank arm 18 of oscillating crank arm shaft 5, oscillated by eccentric disc 8 to which 5 is connected by crank arm 19 and eccentric rods 20. Oscillating crank shafts 7 are journaled in hollow gear shafts 6 and have bearings each in only one of the two crank frames 9.

The rotation and oscillation of wing frames 12—13 are controlled and operated as follows:

The motors 2 transmit power by means of universal jointed motor crank shafts 3 to hollow gear shafts 6 to which they are connected by crank, rod and like gear connections, turning crank frames 9 and eccentric discs 8 in a direction from above forward.

The rotation of eccentric discs 8 cause oscillation of crank arm shafts 5, to which they are connected by eccentric rods 20 and crank arms 19, and then of oscillating crank shafts 7, to which crank arm shafts 5 are connected by crank arms 18 and 16, and rods 17, and finally, of rotating and oscillating crank shafts 10, to which oscillating crank shafts 7 are connected by rods 15.

By this arrangement of the different parts, the wing frames fast on shafts 10, are forced to oscillate in the opposite direction to that of the rotation of the crank frames 9 during their downward movement, but in the same direction while being raised or to rotate and oscillate in a manner similar to that of the wings of a bird in flight, thus enabling the wings to compress the air on the downward movement and by reason of their flexibility, elasticity as well as the looseness of their rear edges to evade the air on the upward movement. The elasticity of spring arms 12 also provides for the passage of air over the rear edges of the wings without resistance at all times as well as increased power of propulsion.

Steering in the horizontal plane is attained by operation of rudders placed at the rear of car or fuselage, not shown on drawing, in such positions as will enable them to catch the air currents thrown by the descending wings.

Steering in the vertical plane may be accomplished by the increase or decrease in the speed of the motors, as well as by rudders in the lighter machines.

What I claim is:

1. A flying machine, comprising a body having parallel arms rotatably mounted therein, said parallel arms being rotatable in a vertical plane and having horizontal oscillatable universal jointed shafts mounted therebetween, said shafts having elastic wing frames rigidly affixed thereto, flexible wings with rigid front edges and loose rear edges mounted in said frames, and means for oscillating the wing frames in the arms in such manner that their oscillation is in the opposite direction to that of the rotation of said arms in their descent but in the same direction in their ascent.

2. A flying machine, comprising a body having parallel arms rotatably mounted therein, said parallel arms being rotatable in a vertical plane and having parallel horizontal oscillatable universal jointed shafts mounted therebetween, said shafts having elastic wing frames rigidly affixed thereto, flexible wings with rigid front edges and loose rear edges mounted in said frames, means for rotating the arms in unison and means for oscillating the wing frames in the arms in such manner that their oscillation is in the opposite direction to that of the rotation of said arms in their descent but in the same direction in their ascent.

3. A flying machine, comprising elastic oscillatable wing frames rigidly affixed to parallel horizontal and universal jointed shafts oscillatably mounted in and between and moved in circular orbits by parallel and in a vertical plane rotatable arms rotatably mounted in and at each side of a body, flexible wings with rigid front edges and loose rear edges mounted in said frames, means for rotating the arms in unison and means for oscillating the wing frames in the arms in such manner that their oscillation is in the opposite direction to that of the rotation of said arms in their descent but in the same direction in their ascent.

Signed at New York city in the county of New York and State of New York this 16th day of February A. D. 1926.

GUSTAF HEDÉN.